US010090867B2

(12) United States Patent
Williams

(10) Patent No.: US 10,090,867 B2
(45) Date of Patent: Oct. 2, 2018

(54) SYSTEM AND METHOD FOR HETERODYNED COMMUNICATION

(71) Applicant: Cable Television Laboratories, Inc., Louisville, CO (US)

(72) Inventor: Thomas Williams, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/387,543

(22) Filed: Dec. 21, 2016

(65) Prior Publication Data
US 2017/0179981 A1 Jun. 22, 2017

Related U.S. Application Data

(60) Provisional application No. 62/270,406, filed on Dec. 21, 2015.

(51) Int. Cl.
H04B 1/00 (2006.01)
H04L 5/14 (2006.01)

(52) U.S. Cl.
CPC ......... H04B 1/0057 (2013.01); H04L 5/1461 (2013.01)

(58) Field of Classification Search
USPC ......................................... 375/350, 316, 285
See application file for complete search history.

(56) References Cited

U.S. PATENT DOCUMENTS

| 5,802,463 | A  | * | 9/1998 | Zuckerman | H03D 3/00 455/208 |
| 8,102,943 | B1 | * | 1/2012 | Khlat | H04B 1/0007 375/316 |
| 2005/0048939 | A1 | * | 3/2005 | McMullin | H04B 1/28 455/189.1 |
| 2009/0116578 | A1 | * | 5/2009 | Sperlich | H03F 1/3247 375/285 |
| 2014/0140455 | A1 | * | 5/2014 | Mirzaei | H04B 1/006 375/350 |
| 2016/0248575 | A1 | * | 8/2016 | Li | H04B 1/123 |

* cited by examiner

Primary Examiner — Eva Puente
(74) Attorney, Agent, or Firm — David D. Smith

(57) ABSTRACT

A system and method for protecting a cable modem's receiver from transmitter overload when using a splitter/combiner device in place of a conventional (diplex) filter. Instead of a diplex filter to separate transmit and receive bands, a terminal device can use an isolation device, such as the splitter/combiner, or a circulator. This provides an ability to use a frequency band for either upstream transmissions or downstream reception, but creates a problem of receiver overload when the isolation device has insufficient isolation or a back-reflection occurs. Use of agile local oscillators allows the direction of the signal in the band to change very rapidly. Likewise a receive frequency can by dynamically reassigned by retuning a LO, which may employ direct digital synthesis.

14 Claims, 8 Drawing Sheets

SYSTEM AND METHOD FOR HETERODYNED COMMUNICATION

RELATED APPLICATIONS

This application claims priority to U.S. Provisional Application Ser. No. 62/270,406 (hereinafter "'406 provisional"), filed 21 Dec. 2015 and incorporated herein by reference.

BACKGROUND

One challenge facing operators today is insufficient upstream bandwidth due to current sub-split frequency plans. A diplexer consists of a common port connected to a cable transporting two way signals, a high pass port connected to a receiver, and a low pass port connected to a transmitter. For example, some cable architectures utilize a fixed diplex filter for sub-split frequencies. One such sub-split frequency plan is 5-42 MHz upstream and 50-1000 MHz downstream. This severely limits upstream bandwidth for the benefit of downstream transmissions. Operators are looking at mid, or even higher, split frequency plans to increase the upstream bandwidth, but this obviously reduces the downstream bandwidth their customers have become accustomed to. Utilizing multiple fixed diplexers or switched diplexers within modems is possible but presents operational problems for modems and increases the expense and complexity of modems employing switched diplexers.

SUMMARY OF THE INVENTION

Node plus zero (N+0), full-duplex, and half-duplex systems provide an opportunity for a new and different approach to be employed that offers one or both of increased upstream and downstream bandwidth. The present invention is such a system. Furthermore, the present invention has applications in conventional networks with modems having different sub-split frequencies.

The present heterodyned communication system and method may be applied to N+0 architectures, full-duplex networks, and half-duplex networks. Conventional 2-way amplifiers utilize diplex filters and provide signal gain to overcome cable loss. The diplex filters separate frequency bands and prevent amplifier oscillation. In such systems where 2-way amplifiers are removed signals may be transmitted in both directions on the coaxial cable at the same frequency. In one embodiment, the present heterodyned communication system isolates the transmit and receive side of a modem, CPEs, etc., which enables the elimination of diplexer filters. Isolation devices replacing diplexers may be wideband splitter/combiners or circulators. There still remains a problem of signals from a modem's own transmitter, or a nearby transmitter, overloading the receiver, a problem which is also solved herein.

Thus, the diplexer-less design described herein excels where there is a requirement for high isolation between upstream and downstream frequency bands. This is accomplished by employing agile heterodyned receivers in place of a fixed-tuned diplexer filters. Such a receiver is configured with a high dynamic range mixer which tunes the desired downstream frequency band while rejecting a transmitted signal by means of an intermediate frequency (IF) bandpass filter.

One of the advantages of this design is the ability to rapidly re-tune receive band frequencies by simply changing the frequency of the receive local oscillator. In one embodiment, the CPE/modem controls the LO based on bandwidth allocations handed down by a modem termination system (MTS), such as from a cable modem termination system (CMTS), a mobile core, a Wi-Fi core, etc. In a separate embodiment the MTS provides the CPE/modem direct instructions to tune the receive local oscillator to a designated band at a specific time, e.g., via a MAP or a modified MAP in the case of a cable network, or some type of grant in the case of a Wi-Fi, LTE, or mobile operator based network. In yet another embodiment, control over the receive local oscillator is provided by an out of band message from the MTS to CPE/modem.

In an embodiment a circulator is used to reduce TX-RX crosstalk. In such a system, a circulator replaces splitter/combiner 214 in the CPE (see below).

In an embodiment, the present system and method provides for a cable modem that may be built utilizing heterodyne techniques to eliminate a fixed diplex filter. This results in a truly universal customer premises device (CPD or CPE), such as a cable modem. The present system and method may leverage a high dynamic range double balanced mixer to locate a sensitive receive signal frequency band proximate a transmit signal frequency band from a powerful transmitter. This is all done without the use of diplex filtering and without receiver overload problems that normally would result from the removal of diplex filters.

BRIEF DESCRIPTION OF THE INVENTION

DETAILED DESCRIPTION OF THE FIGURES

Figure 1:
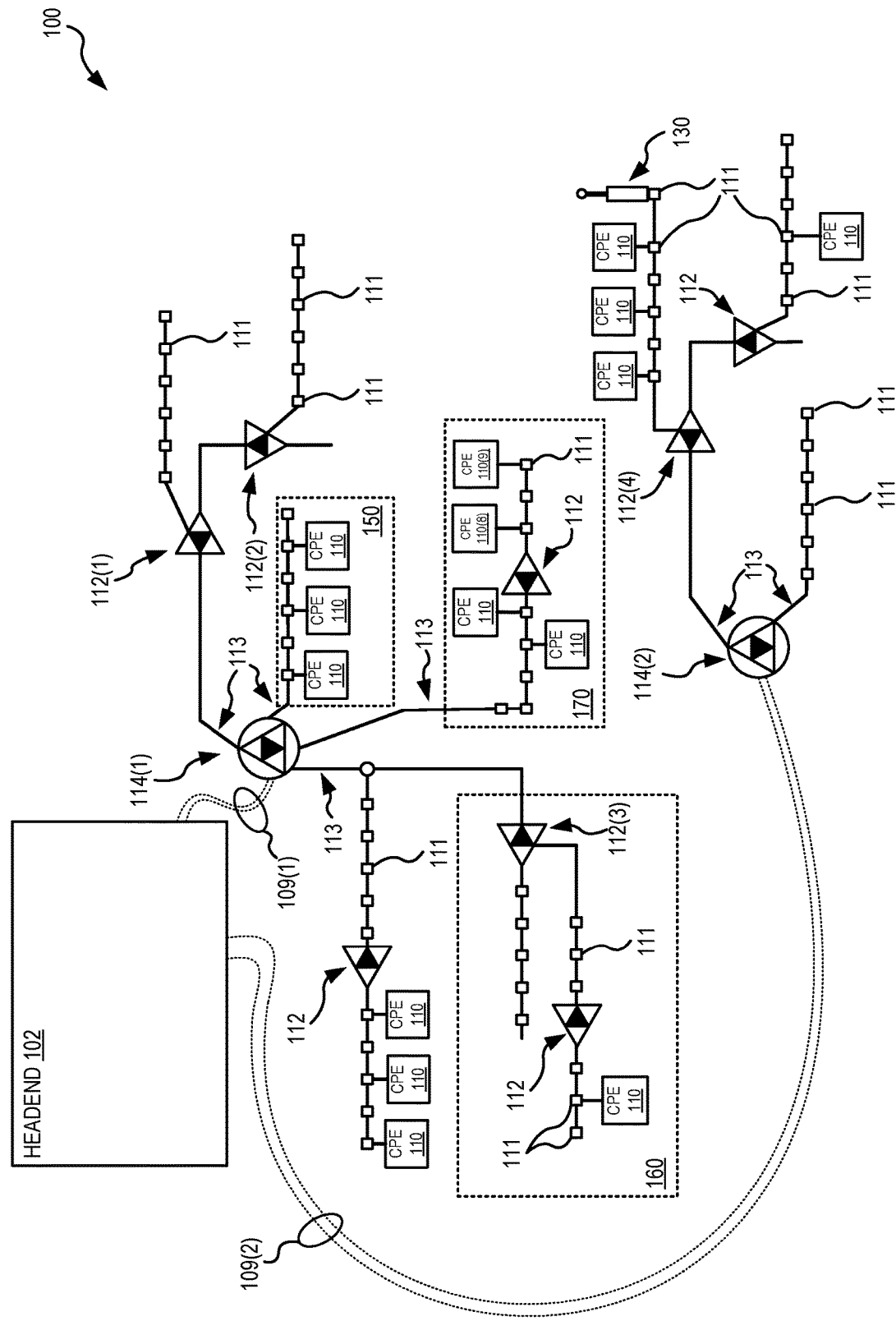
FIG. 1 is one exemplary environment the present heterodyned communication system may exist in, in an embodiment.

In a branch communication networks having a wide frequency response and low path loss, including an all-passive tree and branch communication networks, a conventional communication network with a modem termination system (MTS) can serve multiple terminal units, e.g., modems, radio heads, etc. An example of such as system is a DOCSIS communication system with a CMTS serving multiple CM terminals. DOCSIS networks are designed to continuously transmit multiple downstream signals while the upstream signals are a mixture of time division duplexing (TDD) and frequency division duplexing (FDD). It is common that in such 42 MHz upstream systems four 6.4 MHz frequency bands are shared in a time division duplex manner. Most DOCSIS downstream band receivers listen to all traffic for the purpose of identifying a downstream packet that is addressed to their specific terminal, and for upstream transmission opportunities An alternative to such a design utilizes an agile frequency division duplexing (FDD) system that assigns upstream and downstream bandwidths, depending on instantaneous needs. That is, if in one instance more upstream bandwidth is required the system may quickly adapt to the system's needs by dividing up the bandwidth to accommodate the upstream requirement. In the next instance the system can reconfigure to provide more bandwidth for downstream transmissions. Another approach is to use time division duplex (TDD) where a first transmission(s) is sent upstream during a first time period in a band and a second transmission is sent downstream in a second time period in the same band.

In an embodiment, a flexible communications system based on a software defined radio (SDR), such as an Ettus model B200, may be configured with a customer premises equipment (CPE). While this may have some limitations, a deeper inspection reveals technical possibilities. For example, one issue with a SDR is a near-far problem for a receiver attempting to listen for a weak signal. The near-far problem is caused by a transmitter on the network overloading a receiver by broadcasting a strong transmission proximate the receiver's receive band such that the transmit signal or artifacts generated by the transmit signal bleed into the receiver. In modern implementations, an automatic gain control circuit may prevent this overload, but in doing so the analog to digital (AD) converter's dynamic range limitation could produce quantizing noise while attempting to digitize the transmit signal.

In a network application, up or down conversion to a higher or lower frequency via a heterodyne is possible, followed by filtering and then demodulation. The frequency agility feature of a modern direct digital synthesis (DDS) oscillator means the upstream and downstream bands can be used for transmission and reception can be changed very rapidly. For example, in one millisecond, a modem can use the 50-500 MHz band to transmit upstream, and in the next millisecond it can be utilized to receive downstream.

When designing and implementing the present system and method a number of considerations have been contemplated. For example, local oscillators should have low phase noise, particularly when OFDM modulation is used. Adjacent channel rejection as well as transmitter signal purity are dependent on the phase noise at receive and transmit local oscillators. Furthermore, local oscillator phase noise may adversely impact the achievable Signal-to-Noise ratio (SNR) when listening for or receiving a frequency modulated (FM) or phase-modulated (PM) signal. Still furthermore, and specifically relevant to heterodyne systems, mixing a clean low-phase-noise RF signal with a poor phase noise (noisy) local oscillator will produce a noisy intermediate frequency (IF). Another design consideration is the use of high quality, low harmonic power amplifier(s) within the heterodyne circuit. A poor harmonics power amplifier produces signals that bleed into the receive band, again severely impacting data recovery. Higher quality amplifiers with low harmonics limit, or even eliminate, this problem.

Additionally, heterodyning can be used to assist D-A and A-D conversion steps. That is, one or more heterodyne circuits may be utilized to accommodate frequency capabilities of analog-to-digital converter (ADC) and digital-to-analog converter (DAC) by stepping up or down an incoming or outgoing signal to match the ADC or DAC capabilities. Single conversion is illustrated but dual or even triple conversion can be used as needed. Also note ADC can be used in subsampling mode. That is, a ADC may be used in a Nyquist sub-sampling mode such that one of the higher order functions generated by sampling the signal at least at twice the highest frequency component, as described by the Nyquist theorem, may be selected to match the ADC capability or to utilize a band that is unencumbered by noise or other artifacts.

It will be understood, due to the practical filter design parameters, that the exemplary frequencies discussed herein may be changed based on their specific application and system quality and parameters and due the fact that "brick-wall" filters are not practical.

As discussed above, the present system and method may be utilized in a full duplex communication system where transmission and reception occur simultaneously and in the same frequency band. In the full duplex case splitter/combiner isolation is important, and any back-reflection, for example from an impedance mismatch, shield break, moisture in the line, etc., needs to be canceled at the receiver.

Also, switchable filters are anticipated. For example, the LPF on the transmit side may have its bandwidth reduced to ease intermodulation and harmonic control. The BPF at the receive side can be switched to a lower/higher and/or narrower/wider bandwidth to ease the job of the A-D converter.

Mixer linearity can also impact performance of the present heterodyne communication system and method. As such, high quality mixers should be used with sufficient LO power to accommodate high signal levels, as needed.

FIG. 1 schematically illustrates a communication system in which the present system and method may exist. System 100 is shown as a cable communication network, but may be any communication network which may benefit from the present invention, for example a DSL network.

System 100 includes a headend 102 in optical communication via optical connections 109(1) and 109(2), to fiber nodes 114(1) and 114(2), respectively. Connected to fiber nodes 114 via connection 113 are a plurality of taps 111, and/or amplifiers 112, depending on the "branch" (see below). In system 100 taps 111 are shown connected to a customer premises equipment (CPE) 110 and a radio head/transceiver 130. For simplicity and clarity of illustration, some taps 111 are shown with nothing connected to them. It will be understood that taps 111 may have more than one CPE 110 and/or radio head 130 connected or otherwise in communication with it, but for clarity of illustration only a single CPE 110 and radio transceiver 130 are shown in communication with a tap 111. It will also be understood that a connection to a tap 111 may be a wired connection or may be wireless, for example, in the case of a wireless tap 111.

Some branches are passive branches, such as branch 150. Other branches are non-passive branches, such as branch 160. Still other branches are a mix of passive and non-passive, such as branch 170, which is initially passive and then non-passive after branch 170's amplifier 112.

Figure 2:
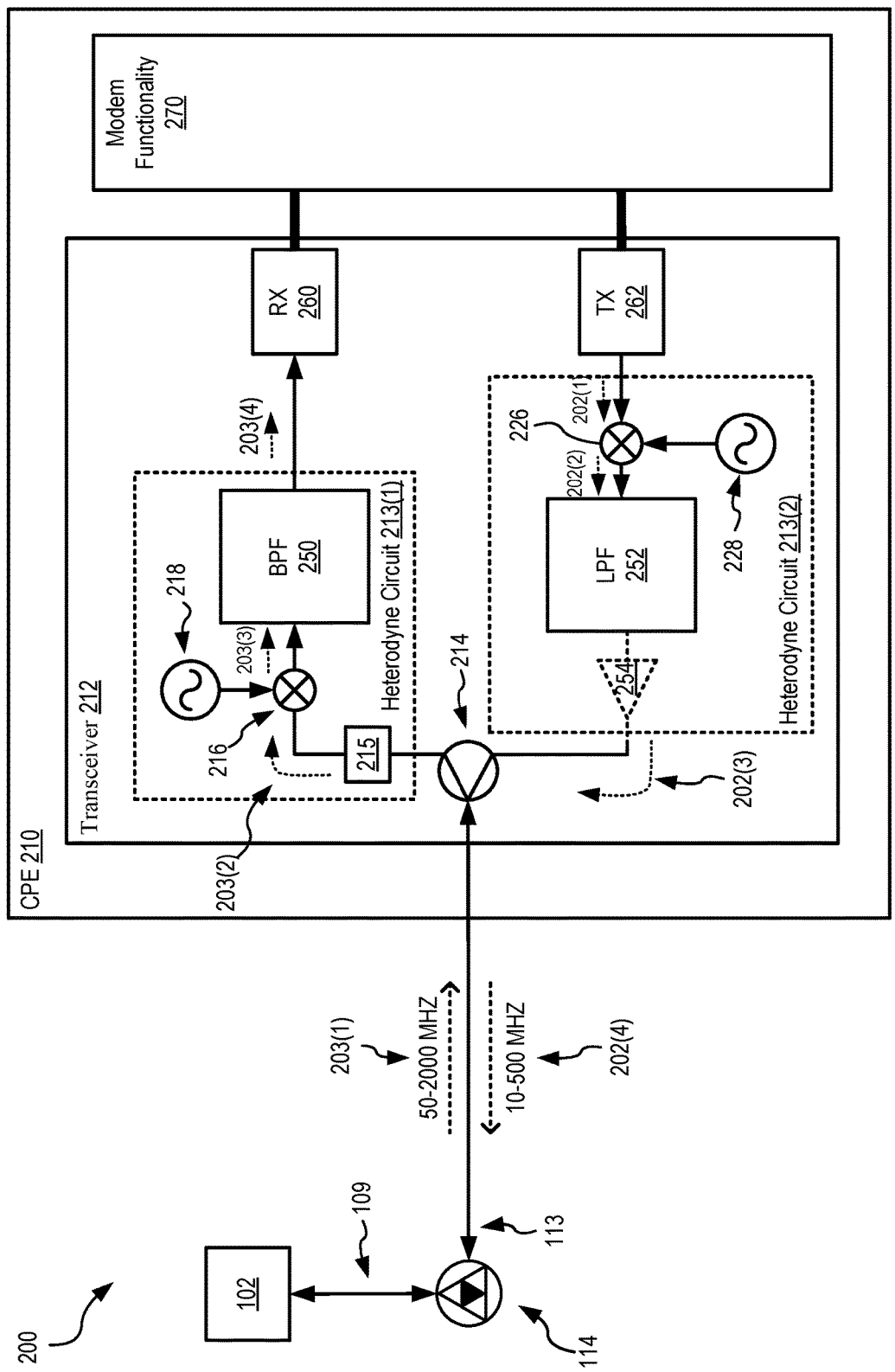
FIG. 2 shows a heterodyned communications system, in an embodiment.

In the case of system 100 of FIG. 1, the present system and method may be implemented within or executed by a CPE 110 or a radio head 130, see FIG. 2 for more details. The following description is directed to a CPE implementation of the present invention, but it will be understood that it equally applies to any network connected device that both receives and transmits via the network, such as radio head 130. Examples of radio head 130 include but are not limited to a Wi-Fi access point, an LTE eNodeB, a small cell, or the like.

FIG. 2 schematically illustrates a system 200 including a fiber node 114 connected to a CPE 210 via connection 113 and headend 102 via optical connection 109. CPE 210 may be a CPE 110 or radio heads 130 of FIG. 1 implemented with heterodyne functionality, as discussed in more detail below.

In one example of FIG. 2, system 200 delivers upstream signals to almost 500 MHz and receives downstream signals from below 50 MHz to above 2000 MHz. Other implementation exit without departing from the scope herein.

CPE 210 includes at transceiver 212 and modem functionality 270. Modem 270 includes all functionality after the transceivers and is separate for the sake of clarity.

Transceiver 212 includes a splitter/combiner (S/C) 214, two heterodyne circuits 213(1) and 213(2), a receiver (RX) 260, and a transmitter (TX) 262. Transceiver 212 may also include an image rejection filter 215 located at the received side of S/C 214 or the fiber node 114 side of S/C 214. Image rejection filter 215 protects the receiver from energy at the image frequency. Receive heterodyne circuit 213(1) is configured with a mixer 216 which can be a double balance mixer, a local oscillator (LO) 218, and a bandpass filter (BPF) 250. Transmit heterodyne circuit 213(2) is configured with a mixer 226, a local oscillator 228 and a low pass filter (LPF) 252. LPF 252 may be implemented as a fixed frequency filter or as a switchable low pass filter. Alternately S/C 214 may be replaced by a circulator to isolate the receiver from the transmitter's energy.

Transceiver 212 takes in a signal from fiber node 114, routes signal 203(2) via S/C 214 to the receive side circuit 213(1), mixes signal 203(2) with a LO 218 generated signal to create unfiltered IF signal 203(3), applies bandpass filter 250 to the mixed signal 203(3) to produce filtered IF signal 203(4) and forwards signal 203(4) to the modem for processing, which frequency involves gain adjustment and A-D conversion (not illustrated). Transceiver 212 also takes signal 202(1) from the modem, mixes it with a LO 228 signal to produce signal 202(2), applies a low pass filter to produce signal 202(3), optionally amplifies signal 202(3) and sends it to the fiber node 114 as signal 202(4). Conventionally D-A converters, followed by a low pass filter (both not illustrated) are used to generate signal 202(1). S/C 214 may provide 35 or more dB of port-to-port isolation to assist in TX/RX signal separation. Note that if there is a reflection on connection 113, for example caused by cable damage, a back reflection from transmit signal 202(4) can occur and potentially overload heterodyne circuit 213(1).

In one embodiment, the high dynamic range of the double balanced mixers is utilized to keep CPE 210's upstream transmission 202(4) from overloading its receiver. Such an embodiment may enable a node plus zero (N+0) bandwidth agility.

Heterodyne circuit 213(1) may be configured with a tunable LO 218 and a double balanced mixer 216 to convert, for example, the 500-2000 MHz band to 2100-3500 MHz. The converted 2100-3500 MHz band is then bandpass filtered and then applied to a high-speed A-D converter. The bandpass filter removes transmission energy, such as back-reflections isolation device bleed through, or transmitter harmonics, see FIG. 4B.

The transmit circuit 213(2) has a fixed LO 228 at, for example, 500 MHz. Transmitter 262 generates a signal 202(1), for example, using a D-A converter. Mixer 226 down-converts signal 202(1) to the upstream frequency band of between 10 to 450 MHz, producing signal 202(2). A 450 MHz low pass filter removes LO 228 leakage and image frequencies associated with mixer 226 processing from signal 202(2), which produces signal 202(3), see FIG. 3A, 4A for more details. Heterodyne circuit 213(2) may also amplify signal 203(3) via optional amplifier 254. Signal 202(3) is then routed to fiber node 114 over connection 113 as signal 202(4). Low pass filter 252 can be made tunable or switchable to reduce spurious energy or harmonics.

It will be understood that the present system and method may be fully agile with rapid re-tuning of the receive local oscillator 218 and spectrum from the transmitter circuit 213(2). Likewise local oscillator 228 may be made agile as well.

It will also be understood that the present invention may also be utilized in a non-passive branch of system 100, for example branch 160 or 170. The present invention is useful in the situation where a CPE 110 is configured to operate with a sub-split different from that of neighboring CPEs. For example, CPE 110(8) operates with a 10-40 MHz upstream and 50-1000 MHz downstream sub-split and CPE 110(9) operates with a 10-85 MHz upstream and 85-1000 MHz downstream sub-split. In this example CPE 110(9) may benefit from including a heterodyne circuit 213(1) at the receive side to eliminate interference from transmitted signals by neighboring CPE 110(8) transmission between 50-85 MHz.

Figure 3A:
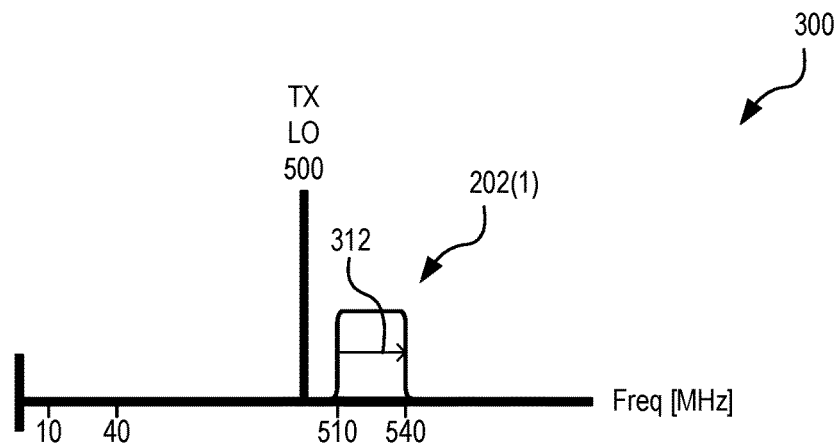
FIG. 3A shows a set of spectral diagrams for the conversion of an upstream signal, in an embodiment.
Figure 3A:
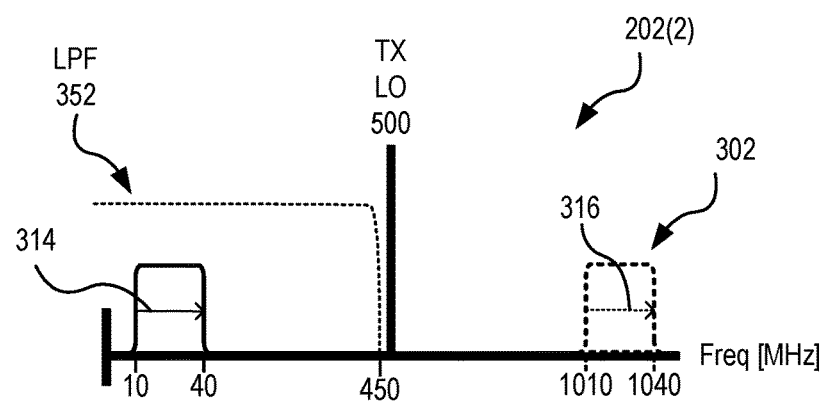
Figure 3A:
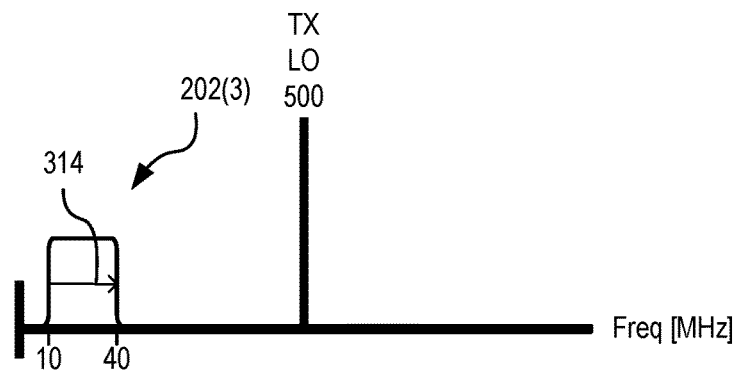
Figure 3B:
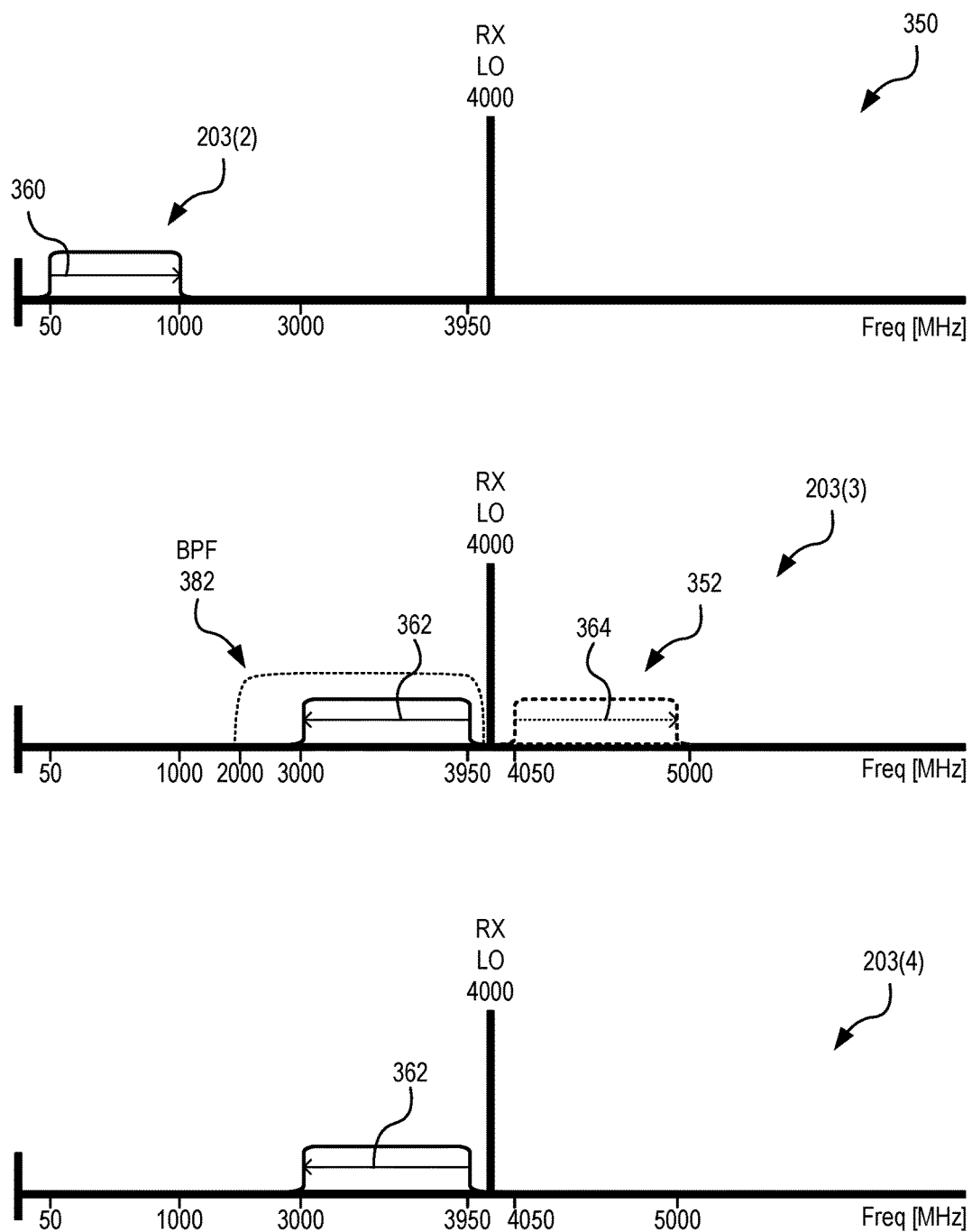
FIG. 3B shows a set of spectral diagrams for the conversion of a downstream signal, in an embodiment.

FIG. 3A and 3B are spectral diagrams detailing the conversion of sub-split 10-40 MHz upstream band signals 202 and 50-1000 MHz downstream band signal 203. FIG. 3A details the transmit side and FIG. 3B details the receive side. FIGS. 3A and 3B are not drawn to scale.

In FIG. 3A, initially signal 202(1) is generated in the range of 510 MHz and 540 MHz. Signal 202(1) is then down converted to a 10-40 MHz signal 202(2) by mixing, at mixer 226, signal 202(1) with a 500 MHz signal from LO 228. Signal 202(2) has a mixer generated image 302. Signal 202(2) then passes through a LPF 352, implemented for example by LPF 252, FIG. 2, to remove image 302 and any noise, which produces signal 202(3).

Arrows 312, 314, and 316 show the directionality of the spectrum for signals 202. Due to the down conversion and filtering, the spectral directionality of initial signal 202(1) and final signal 202(3) are similarly oriented. This is not the case for the receive side as will be discussed for FIGS. 3B and 4B.

On the receive circuit 213(1), a 50-1000 MHz signal 203(2) is up-converted by mixing, at mixer 216, signal 203(2) with a 4000 MHz LO 218 signal to generate a 3000-3950 MHz signal 203(3). Signal 203(3) also has a mixer generated image 352. By passing signal 203(3) through BPF 382 implemented by BPF 250, image 352 is removed and signal 203(4) is produced.

Arrows 360, 362, and 364 show the directionality of signal 203's spectrum. Due to the up-conversion and filtering, the spectral directionality of initial signal 203(2) and final signal 203(4) oppositely oriented. That is, data at 1000 MHz in signal 203(2) is located at 3000 MHz in signal 203(4). Similarly, data at 50 MHz in signal 203(2) is located at 3950 MHz in signal 203(4). Thus the spectrum of signal 203(4) is inverted relative to the original signal, signal 203(2).

Figure 4A:
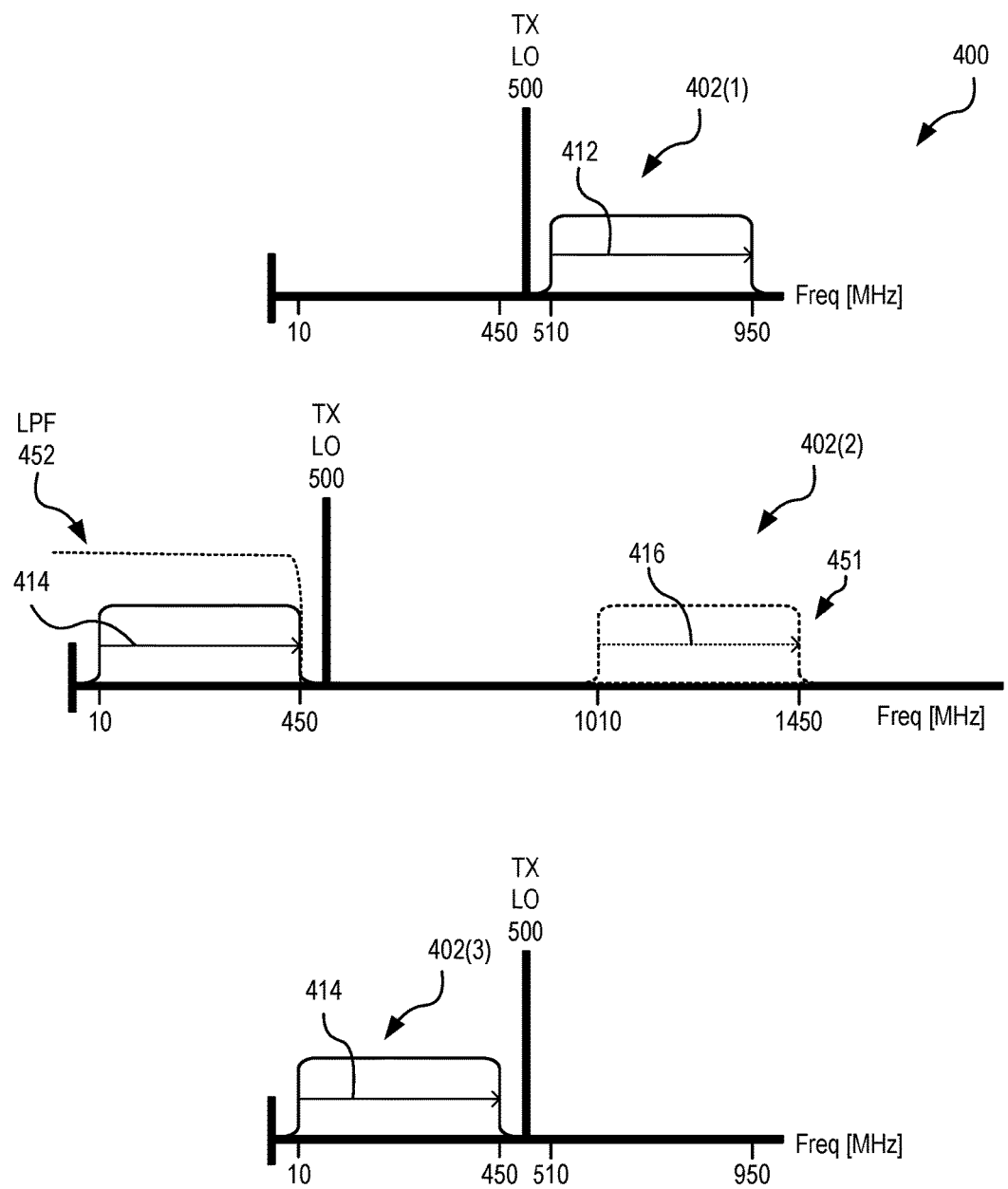
FIG. 4A shows a set of spectral diagrams for the conversion of an upstream signal, in an embodiment.
Figure 4B:
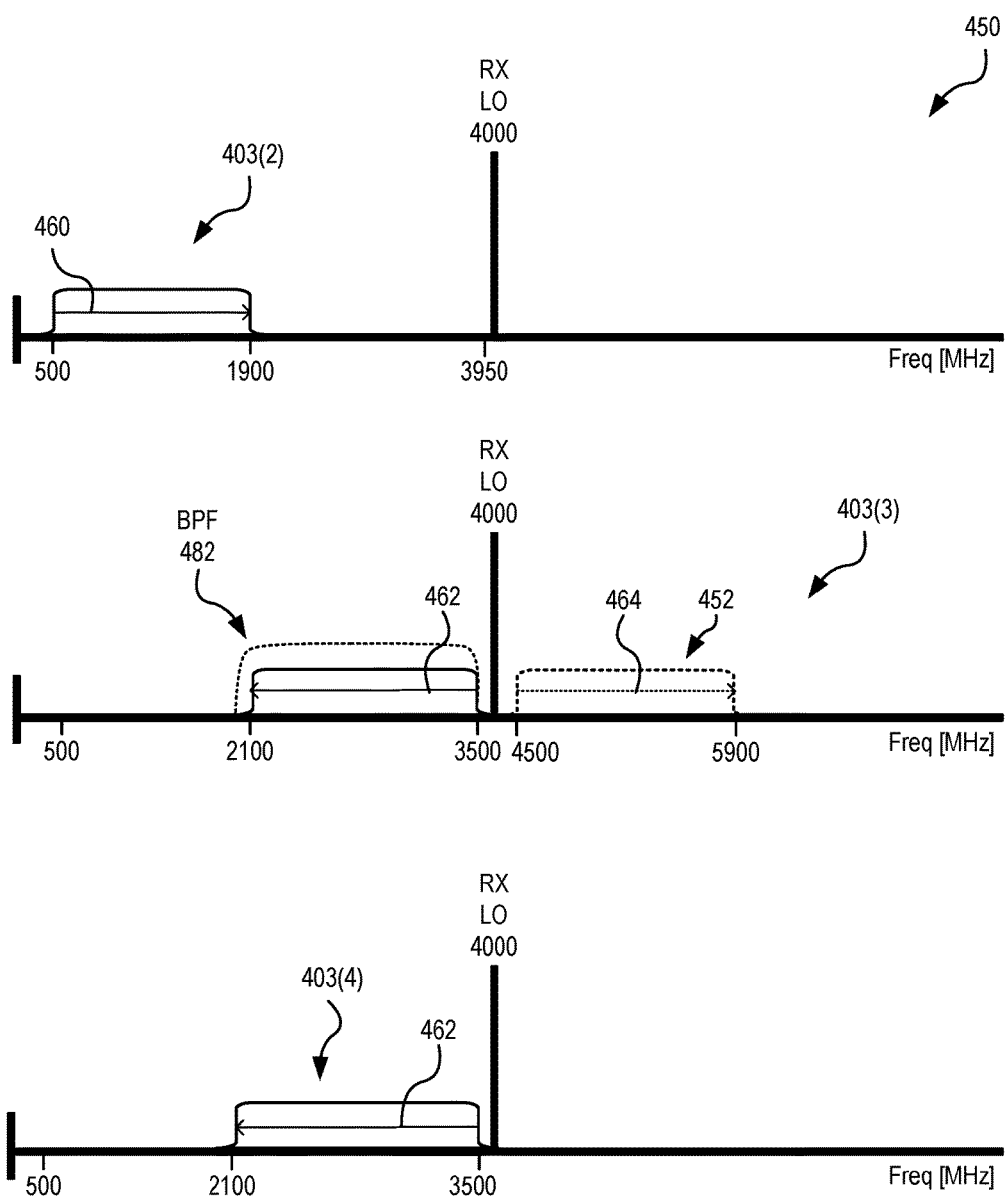
FIG. 4B shows a set of spectral diagrams for the conversion of a downstream signal, in an embodiment.

FIG. 4A and 4B are spectral diagrams detailing the conversion of sub-split 10-450 MHz upstream band signals 402, which is similar to signals 202 of FIG. 3A although at a larger bandwidth, and 500-2000 MHz downstream band signal 403, similar to signal 203 of FIG. 3B although at a larger bandwidth. FIG. 4A details the transmit side and FIG. 4B details the receive side. FIGS. 4A and 4B are not drawn to scale.

In FIG. 4A, initially signal 402(1) is generated in the range of 510 MHz and 950 MHz. Signal 402(1) is then down converted to a 10-450 MHz signal 402(2) by mixing, at mixer 226, signal 402(1) with a 500 MHz signal from LO 228. Signal 402(2) has a mixer generated image 451. Signal 402(2) then passes through a LPF 452, implemented for example by LPF 252 of FIG. 2, to remove image 451, which produces signal 402(3).

Arrows 412, 414, and 416 show the directionality of the spectrum for signals 402. Due to the down conversion and filtering, the spectral layout of initial signal 202(1) and final signal 202(3) are similarly oriented.

In FIG. 4B a 500-1900 MHz signal 403(2) is up-converted by mixing, at mixer 216, signal 403(2) with a 4000 MHz LO 218 signal to generate a 2100-3500 MHz signal 403(3). Signal 403(3) includes a mixer generated image 452. By passing signal 403(3) through BPF 482, implemented for example by BPF 250, image 452 is removed, which produces signal 403(4).

Arrows 460, 462, and 464 show the directionality of the spectrum of the signals 403. Due to the up-conversion and filtering, the spectral orientation of initial signal 403(2) and final signal 403(4) oppositely oriented. That is, data at 1900 MHz in signal 403(2) is located at 2100 MHz in signal 403(4). Similarly, data at 500 MHz in signal 403(2) is located at 3500 MHz in signal 403(4). Thus the spectrum of signal 403(4) is inverted relative to the original signal, signal 403(2).

Figure 5:
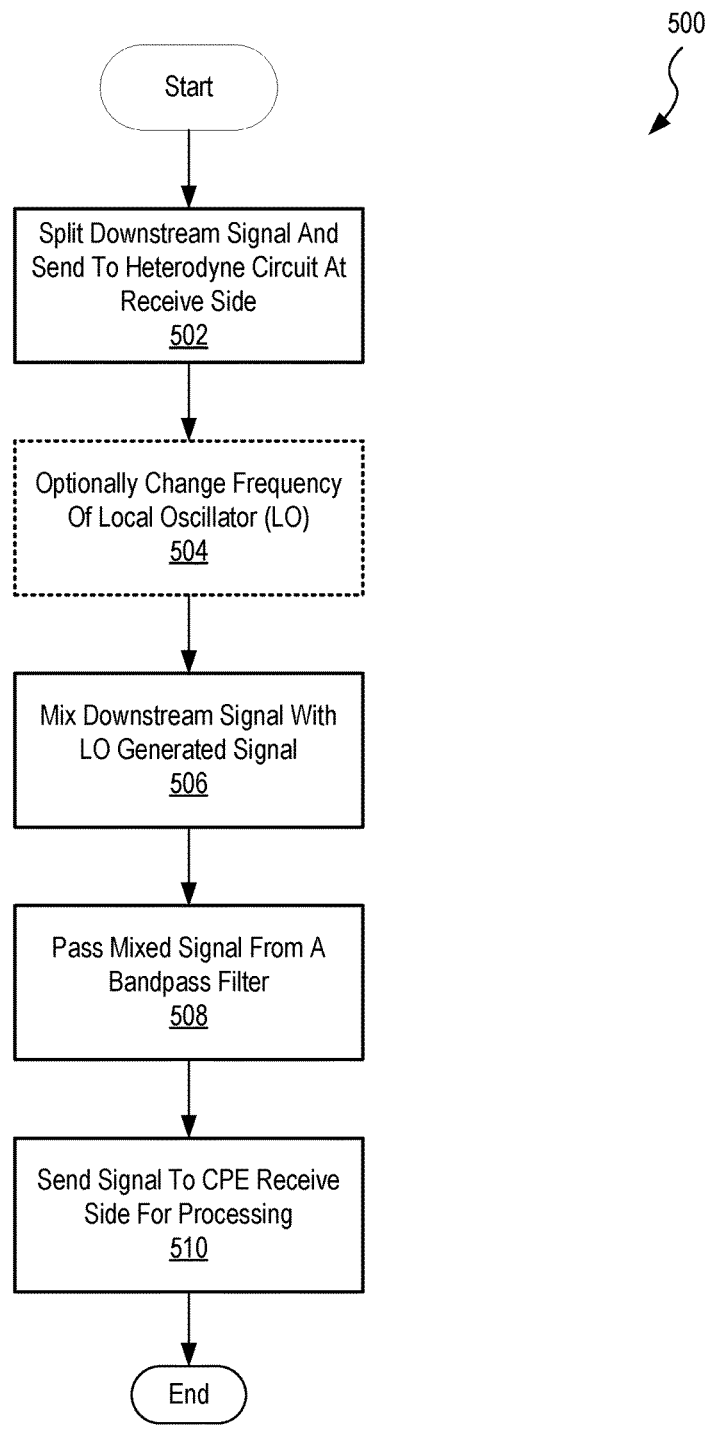
FIG. 5 shows a method for processing an incoming signal, in an embodiment.

FIG. 5 shows a method 500 for processing an incoming signal 203(1), 403(1).

In step 502 method 500 splits the downstream signal and sends it to the heterodyne circuit at the CPE's receive side. One example of step 502 is signal 203(1) entering S/C 214 where signal 203(1) is processed to produce signal 203(2) which is routed to heterodyne circuit 213(1).

In optional step 504, the frequency of the Local Oscillator (LO) is changed to best isolate signal 203 from other signals on the network or within CPE 210, 110 by shifting the frequency of signal 203. One example of optional step 504 is CPE 110, 210 or modem functionality 270 changing the frequency of LO 218. Instructions for changing the frequency of LO 218 may be provided by, for example, CPE 210, 110 and/or Headend 102.

In step 506 the downstream signal is mixed with the LO generated signal to generate a frequency shifted signal including an unwanted image. One example of step 506 is mixer 216 mixing downstream signal 203(2) and LO 218 generated signal to produce signal 203(3) having an unwanted image. An example of an unwanted image is image 352 of FIG. 3B and image 452 of FIG. 4B.

In step 508 method 500 pass the mixed signal through a bandpass filter to remove the image and any additional information that lays outside the bandpass filter's window. One example of step 508 is signal 203(3) passing through BPF 250, producing signal 203(4).

In step 510 method 500 sends the filtered signal to the CPE's receive side for processing by know techniques. One example of step 510 is signal 203(4) passing from BPF 250, to RX 260 and to modem functionality 270.

Figure 6:
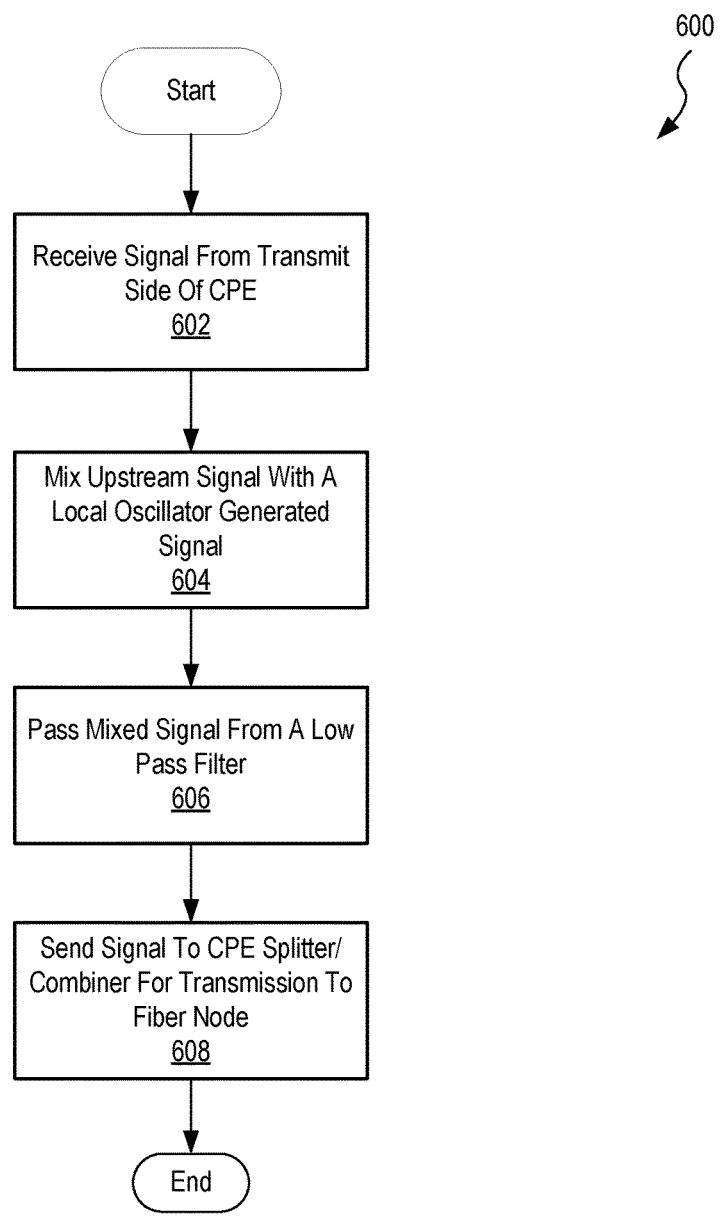
FIG. 6 shows a method for processing an outgoing signal, in an embodiment.

FIG. 6 describes a method 600 for processing an outgoing signal 202(1), 402(1).

In step 602 method 600 receives an upstream signal from the transmit side of the CPE. One example of step 602 is signal 202(1) sent heterodyne circuit 213(2) from modem functionality 270 via TX 262.

In step 604 method 600 mixes the upstream signal with a LO generated signal. One example of step 606 is mixer 226 mixing upstream signal 202(1) and LO 228 generated signal to produce signal 202(2) having an unwanted image. An example of an unwanted image is image 302 of FIG. 3A and image 451 of FIG. 4A.

In step 606 method 600 pass the mixed signal through a low pass filter to remove the image and any additional information that exists above the low pass filter's spectral window. One example of step 606 is signal 202(2) passing through LPF 252, producing signal 203(4) with unwanted image removed.

In step 608 method 600 sends the filtered signal to the splitter/combiner for transmission to the fiber node. One example of step 608 is signal 202(3) passing from S/C 214 to fiber node 114 at signal 202(4).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A heterodyned communication circuit for a customer premises device (CPE) in a diplexerless wired communication network, comprising:
   a tunable receive local oscillator configured to cooperate in up-converting a receive band signal to a bandpass filter frequency for eliminating ingress from a neighboring CPE transmit signal;
   a mixer in communication with a splitter/combiner and the receive local oscillator wherein the mixer mixes the receive band signal provided by the splitter/combiner and a signal generated by the receive local oscillator to produce an up-converted heterodyned signal having at least a portion of the neighboring CPE transmit signal and an unwanted image; and
   a band pass filter configured with the bandpass frequency and configured to process the heterodyned signal to remove the unwanted image and at least a portion of the upstream signal transmitted by the neighboring CPE from the heterodyned signal.

2. The heterodyned communication circuit of claim 1, wherein a receive band, which includes the receive band signal, is set apart from a transmit band to reduce any non-linear distortion produced by one of both of a transmitter and a mixer configured with the CPE.

3. The heterodyned communication circuit of claim 1, wherein a receive band, which includes the receive band signal, is set apart from a transmit band to reduce any non-linear distortion produced by one or both of a transmitter and a mixer configured with a second CPE proximate on the communication network to the CPE.

4. The system of claim 1, wherein the splitter/combiner is a circulator.

5. The system of claim 1, wherein the tunable local oscillator is configured to adapt to one or more neighboring CPE different sub-splits frequency plan.

6. The system of claim 5, wherein the CPE operates with a first sub-split between a first upstream and a first downstream signal and the neighboring CPE operates with a second sub-split between a second upstream and a second downstream signal, wherein a portion of the CPE's first downstream signal partially overlaps a portion of the neighboring CPE's second upstream signal.

7. The system of claim 6, wherein the CPE's receive heterodyned communication circuit is configured to remove the portion of the neighboring CPE's upstream signal that partially overlaps with the portion of the CPE's downstream signal.

8. The system of claim 1, wherein the receive local oscillator is a variable frequency local oscillator configured to operate with a changeable sub-split to adapt to a sub-split of one or more neighboring CPEs, and controllable by the CPE which receives data from remotely supplied resource allocations.

9. The system of claim 1, wherein the wired communication network comprises a full-duplex wired communication network.

10. The system of claim 1, wherein the wired communication network comprises at least in part a half-duplex wired communication network.

11. The system of claim 1, wherein the wired communication network comprises a Node plus zero wired communication network.

12. The system of claim 1, wherein the wired communication network comprises a DOCSIS network.

13. The system of claim 1, where the receive local oscillator's tunable oscillator frequency is determined by a scheduler remote from the CPE and the neighboring CPE.

14. The system of claim 13, where the scheduler is configured with a headend device in a DOCSIS network.

* * * * *